United States Patent
Van Kerkwyk et al.

(10) Patent No.: US 9,690,605 B2
(45) Date of Patent: Jun. 27, 2017

(54) CONFIGURATION OF AN EDGE SWITCH DOWNLINK PORT WITH A NETWORK POLICY OF A PUBLISHED NETWORK CONFIGURATION SERVICE TYPE

(75) Inventors: Ben Collin Van Kerkwyk, Lincoln, CA (US); Charles L. Hudson, Round Rock, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 225 days.

(21) Appl. No.: 14/372,528

(22) PCT Filed: Apr. 9, 2012

(86) PCT No.: PCT/US2012/032794
§ 371 (c)(1),
(2), (4) Date: Jul. 16, 2014

(87) PCT Pub. No.: WO2013/154529
PCT Pub. Date: Oct. 17, 2013

(65) Prior Publication Data
US 2014/0359620 A1    Dec. 4, 2014

(51) Int. Cl.
*G06F 13/00* (2006.01)
*G06F 9/455* (2006.01)
*H04L 12/24* (2006.01)
*H04L 29/12* (2006.01)

(52) U.S. Cl.
CPC ........ *G06F 9/45533* (2013.01); *H04L 41/042* (2013.01); *H04L 41/08* (2013.01); *H04L 61/6022* (2013.01)

(58) Field of Classification Search
CPC ............... H04L 29/08144; H04L 29/06; H04L 29/08072; H04L 29/08171; H04L 12/5695; H04L 42/042; H04L 41/08; H04L 61/6022; G06F 9/45533
USPC .......................................... 709/226
See application file for complete search history.

(56) References Cited

U.S. PATENT DOCUMENTS

| | | |
|---|---|---|
| 6,976,258 B1 | 12/2005 | Goyal et al. |
| 7,649,848 B1 | 1/2010 | Swan et al. |
| 7,710,900 B2 | 5/2010 | Andrews et al. |
| 7,877,485 B2 | 1/2011 | Piper et al. |
| 7,912,460 B2 | 3/2011 | Takeda |
| 8,054,832 B1 | 11/2011 | Shukla et al. |
| 8,111,620 B1 | 2/2012 | Swan et al. |

(Continued)

FOREIGN PATENT DOCUMENTS

EP    2043320    4/2009

OTHER PUBLICATIONS

Cisco, "Cisco Nexus 1000V Series Switches," Data Sheet, Dec. 3, 2011, <http://web.archive.org/web/20111203061812/http://www.cisco.com/en/US/prod/collateral/switches/ps9441/ps9902/data_sheet_c78-492971.pdf>.
Cisco, "Cisco Nexus 1010 and 1010-X Virtual Services Appliances," Data Sheet, Mar. 2012.
Hewlett-Packard Development Company, L.P., "Creating and Managing vswitches" Jan. 29, 2009, <http://docstore.mik.ua/manuals/hp-ux/en/T2767-90141/ch08s02.html>.
Hewlett-Packard Development Company, L.P., "QuickSpecs," HP Networking DCM Controller, ver. 2, Nov. 12, 2010.
Huawei Technologies Co., Ltd., "Brain or the Virtualized Data Center—Network Virutal Machine-aware Solution," Data Sheet, available Feb. 2, 2012, <http://web.archive.org/web/20120202163418/http://www.huawei.com/enterprise/catalog.do?id=16407>.

(Continued)

*Primary Examiner* — Robert B Harrell
(74) *Attorney, Agent, or Firm* — Hewlett Packard Enterprise Patent Department

(57) ABSTRACT

Examples disclosed herein relate to associating an identifier for a virtual machine with a published network configuration service type. Examples include configuring an edge switch with a network policy in response to receiving the identifier from the edge switch.

15 Claims, 3 Drawing Sheets

(56) References Cited

U.S. PATENT DOCUMENTS

| | | | | |
|---|---|---|---|---|
| 8,718,071 | B2* | 5/2014 | Li | H04L 12/4645 370/395.3 |
| 8,953,621 | B2* | 2/2015 | Sultan | H04L 12/4645 370/401 |
| 2010/0061241 | A1 | 3/2010 | Sindhu et al. | |
| 2010/0061389 | A1 | 3/2010 | Sindhu et al. | |
| 2010/0061394 | A1 | 3/2010 | Sindhu et al. | |
| 2010/0165876 | A1 | 7/2010 | Shukla et al. | |
| 2011/0035494 | A1 | 2/2011 | Pandey et al. | |
| 2011/0138384 | A1 | 6/2011 | Bozek et al. | |
| 2011/0143782 | A1 | 6/2011 | Dowlatkhah | |
| 2011/0154320 | A1 | 6/2011 | Verma | |
| 2012/0063363 | A1* | 3/2012 | Li | H04L 12/4645 370/255 |
| 2012/0063466 | A1* | 3/2012 | Sultan | H04L 12/4645 370/401 |

OTHER PUBLICATIONS

IEEE, Inc., "802.1Qbg—Edge Virtual Bridging," Mar. 18, 2012, (web page), <http://web.archive.org/web/20120318064827/http://www.ieee802.org/1/pages/802.1bg.html>.

Kumath et al., "Edge Virtual Bridge Proposal," Apr. 23, 2010, Hewlett-Packard Co., IBM, eds., Version 0, Rev 0.1, <http://www.ieee802.org/1/files/public/docs2010/bg-joint-evb-0410v1.pdf>.

International Searching Authority, International Search Report and Written Opinion, PCT/US2012/032794, Dec. 18, 2012, 10 Pgs.

\* cited by examiner

CONFIGURATION OF AN EDGE SWITCH DOWNLINK PORT WITH A NETWORK POLICY OF A PUBLISHED NETWORK CONFIGURATION SERVICE TYPE

CROSS-REFERENCE TO RELATED APPLICATIONS

This application is a national stage entry of International Application No. PCT/US2012/032794, filed on Apr. 9, 2012. This application is hereby incorporated by reference herein in its entirety.

BACKGROUND

In a computer network, server systems may be connected via network interconnection devices, such as network switches, in some networks, the server systems may be managed by server management tools separate from a network management tool that may manage the network interconnection devices.

BRIEF DESCRIPTION OF THE DRAWINGS

The following detailed description references the drawings, wherein.

DETAILED DESCRIPTION

Figure 1:
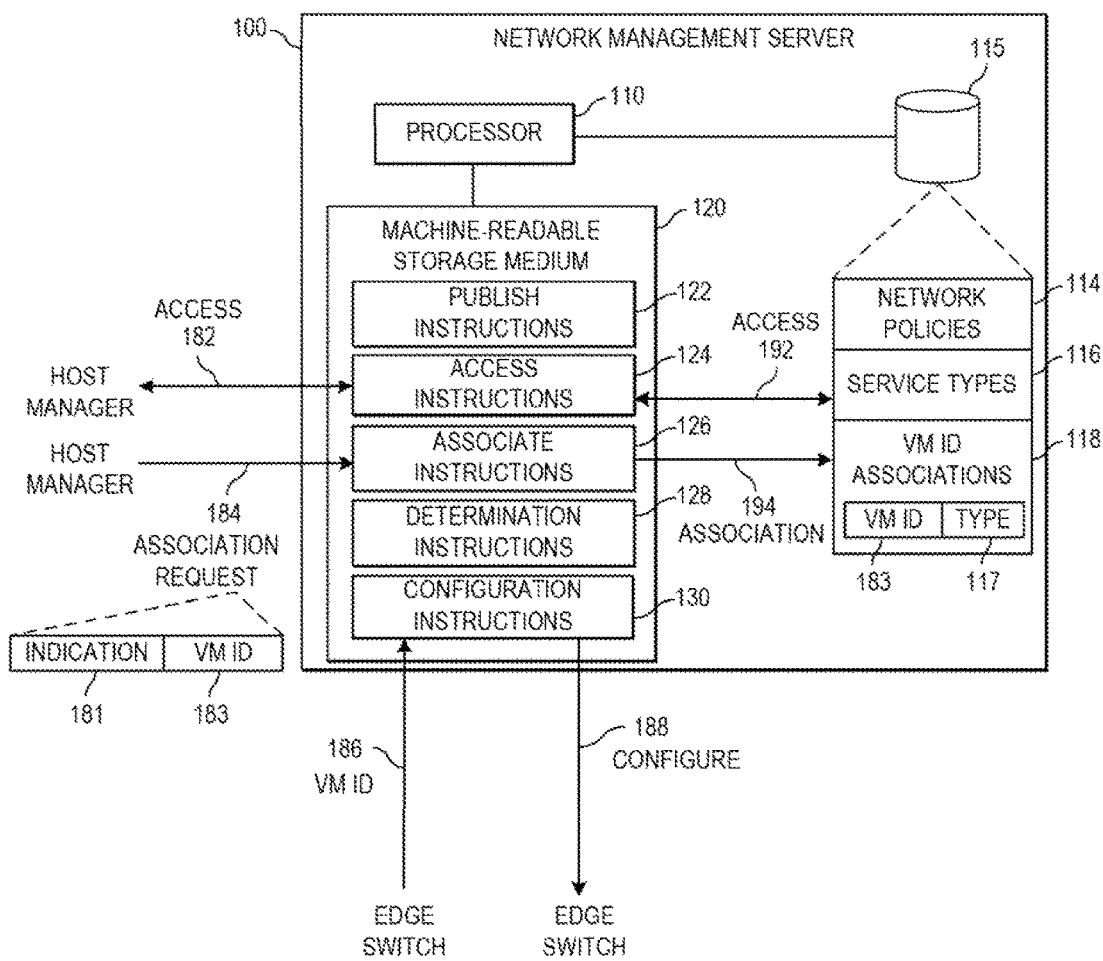
FIG. 1 is a block diagram of an example network management server to configure an edge switch.

As noted above, server systems and network interconnection devices of a computer network may be managed separately and with different management tools. For example, a server management tool may be used to manage a virtual machine (VM) host server hosting a plurality of VMs. In such examples, the server management tool may be used to perform management functions for VMs of at least one VM host server, such as creating, configuring, moving, and deploying virtual machines, etc. A separate network management tool may be used to configure the network interconnection devices to enforce network policies, for example.

In some networks, it may be beneficial to configure the network interconnection devices to accommodate the anticipated network usage of virtual machines currently deployed at VM host servers of the network. However, configuring the network to accommodate deployed virtual machines may involve manual coordination between the separate server and network management tools. For example, a system administrator may use the server management tool to create a virtual machine and provide expected network usage information to the network management tool. A network administrator may then use the network management tool to establish how the network management tool should configure network interconnection devices to accommodate the network usage of the virtual machine. However, such manual actions may delay the configuration of the network to accommodate newly created, migrated, or modified virtual machines, and may be a potential source of configuration errors.

To address these issues, examples disclosed herein provide a network management server to publish predefined network configuration service types each associated with a plurality of network policies. In such examples, a virtual machine host manager may access the service types and request that the network management server associate a given virtual machine with a selected service type. In some examples, the network management server may, in response, associate the selected service type with an identifier for the virtual machine. In such examples, the network management server may configure network interconnection devices in accordance with the selected service type in response to receiving the identifier when the virtual machine is deployed.

In this manner, by allowing a host manager to associate a virtual machine with a published service type, examples described herein may enable a host manager to specify how the network management server should configure network interconnection devices for a virtual machine, without manual intervention by a network administrator at the network management server. Accordingly, examples described herein may simplify and speed the process of creating and deploying a virtual machine on a computer network. Examples described herein may also eliminate the complexity and potential errors that may result from using a third tool separate from the network management server and the host manager to specify network configuration policies to be used when a given virtual machine is deployed.

Referring now to the drawings, FIG. 1 is a block diagram of an example network management server 100 to configure an edge switch. Any network management server described herein may be, for example, a computing device such as a Local Area Network (LAN) server, a database server, a web server, or any other server or computing device suitable for managing components of a computer network, such as network interconnection devices and other servers. As used herein, a computer network may be, for example, a LAN, a wireless local area network (WLAN), a wide area network (WAN), an enterprise private network, a virtual private network (VPN), and the like. Additionally, as used herein, a "network interconnection device" may be a network switch, a network bridge, or any other computer networking device to communicate information between portions of a computer network. In the example of FIG. 1, network management server 100 may manage at least one network interconnection device of a computer network. As used herein, a server to "manage" a network interconnection device is a server capable of monitoring the behavior of the device and configuring the device. For example, a server managing a network interconnection device may configure the device to enforce at least one network policy and determine resource allocation at the device.

In the example of FIG. 1, network management server 100 includes a processor 110, policy storage 115, and a machine-readable storage medium 120 including (e.g., encoded with) instructions 122, 124, 126, and 128, and 130. In some examples, storage medium 120 may include additional instructions. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionality of any of the instructions of storage medium 120 may be implemented in the form of electronic circuitry, in the form of executable instructions encoded on a machine-readable storage medium or a combination thereof.

As used herein, a "machine-readable storage medium" may be any electronic, magnetic, optical, or other physical storage device to contain or store information such as executable instructions, data, and the like. For example, any machine-readable storage medium described herein may be any of Random Access Memory (RAM), flash memory, a storage drive (e.g., a hard disk), a Compact Disc Read Only Memory (CD-ROM), and the like, or a combination thereof. Further, any machine-readable storage medium described herein may be non-transitory. Policy storage 115 may be a machine-readable storage medium. In some examples, storage 115 may be separate from storage medium 120. In other examples, storage 115 may be part of storage medium 120.

In some examples, policy storage 115 may store a collection of network connection policies 114. As used herein, a "network connection policy" (which may be referred to herein as a "network policy") is information indicating how a computer networking device is to process at least one type of network traffic. For example, a network connection policy may indicate how a network switch is to prioritize network traffic from a particular source, where and how to forward network traffic from a particular source, or how to otherwise process network traffic from the particular source. In some examples, network policies may include virtual LAN (VLAN) assignments, quality of service (QoS) assignments, bandwidth policies, access control list (ACL) information, traffic encapsulation rules, enablement of multi-cast network addresses, or any other suitable policy.

In the example of FIG. 1, instructions 122 may publish a plurality of network configuration service types 116, each associated with a plurality of network connection policies of the network connection policies 114 stored in policy storage 115. As used herein, a "network configuration service type" (which may be referred to herein as a "service type") is a collection of descriptive information associated with a plurality of network connection policies. In some examples, the descriptive information may include at least one of a name of the service type and additional information describing the characteristics of the configuration provided by the service type, in some examples, the descriptive information may indicate a purpose for which policies associated with the service type may configure network interconnection devices of a computer network. For example, one service type may indicate that it is appropriate for configuring network interconnection devices for VMs implementing voice over IP (VOIP), while another service type may indicate that it is appropriate for configuring network interconnection devices for VMs implementing video cast services. In other examples, the descriptive information may describe the manner in which network policies associated with the service type may configure network interconnection devices of a computer network. For example, one service type may indicate that it is appropriate for configuring network interconnection devices for characteristics such as low latency, while another service type may indicate that it is appropriate for configuring network interconnection devices for providing high data volume.

In some examples, service types 116 may be a predefined set of service types offered by network management server 100 for association with virtual machines. In such examples, this predefined set of service types may be offered for association with a virtual machine without manual intervention at the network management server. For example, rather than manually creating a custom set of network policies for each virtual machine at the network management server, examples described herein may allow a host manager to select one of the predefined service types for association with a virtual machine. In such examples, the host manager may associate a virtual machine with one of the service types such that the network management server may deploy the network policies of the service type in response to the virtual machine being started, without manual intervention or input at the network management server.

In some examples, the service types may be created at the network management server based on at least one of expected network usage, expected network workloads, and other expected network behaviors of virtual machines on the computer network managed by the network management server. In such examples, service types may be created for several different types of expected network behavior. For example, service types 116 may include at least one service type tailored for VMs serving high volumes of data, at least one service type tailored for VMs serving video (e.g., in a video-cast service), at least one service type tailored for VMs implementing VOIP, service types for virtual machines implementing other functions, or a combination thereof. Any virtual machine described herein may be, for example, a resource generated by the execution of machine-readable instructions on a physical computing device platform and capable of performing functions of a physical computing device, such as the execution of machine-readable instructions, performing I/O operations, etc. Any virtual machine described herein may be able to for example, execute an operating system, execute multiple applications, and/or execute multiple applications within an operating system executed by the virtual machine.

In some examples, instructions 122 may publish service types 116 in policy storage 115 of network management server 100. For example, policy storage 115 may be accessible at least in part from outside of network management server 100, such as by a host manager, in some examples, the host manager may manage at least one VM host server that may host at least one VM. In some examples, the host manager may access portions of policy storage 115 via access instructions 124, as described in more detail below. In such examples, instructions 122 may publish service types 116 by storing the service types 116 in policy storage 115.

In the example of FIG. 1, instructions 124 may provide, to at least one device outside of network management server 100, access to the published service types 116 in policy storage 115. In some examples, instructions 124 may provide an interface for accessing service types 116 stored in policy storage 115 from outside of network management server 100. For example, instructions 124 may provide an interface for accessing service types 116 with a host manager. In the example of FIG. 1, the host manager may request and receive access to service types 116 via access communications 182 between host manager and access instructions 124. In such examples, instructions 124 may access service types 116 via access communications 192, and provide the accessed service types 116 to host manager via access communications 182.

In some examples, network management server 100 may receive an association request 184 including an indication 181 of a selected service type 117 of the published service types 116 and including a VM identifier 183 associated with a VM. In response to request 184, instructions 126 may associate, in policy storage 115, the selected service type 117 with the VM identifier 183. For example, instructions 126 may associate selected service type 117 with VM identifier 183 in a collection VM identifier associations 118. In some examples, instructions 126 may provide an association command 194 to policy storage 115 to store an association between the selected service type 117 and the VM identifier 183 in policy storage 115 as one of VM identifier associations 118.

In some examples, the association request 184 may be received from a host manager managing the VM associated with the VM identifier 183. For example, during a process of creating a VM with the host manager, the host manager may be used to select one of service types 116 to be implemented when the VM is started or otherwise deployed. In such examples, during the VM creation process, the host manager may access service types 116 via access communications 182, as described above. In some examples, the host manager may display the accessed service types 116 to a user (e.g., a system administrator), and may receive a selection of one of the service types 116 for the VM being created. In response to this selection, the host manager may provide the association request 184 to network management server 100. Although association request 184 is described in the above example as being provided as part of a VM creation process at the host manager, in other examples, a request 184 may be provided during other processes at the host manager, such as modifying, moving, or otherwise interacting with characteristics of a VM, or as part of a separate service type association process.

As used herein a "virtual machine (VM) identifier" is any information to identify a virtual machine or a functionality, module, component, or other aspect of the virtual machine in a computer network. Also, as used herein, a VM identifier "associated with" a VM may be a VM identifier to identify the VM itself, or a VM identifier to identify an aspect (e.g., a functionality, module, etc.) of the VM. In some examples, a single VM may be associated with multiple VM identifiers each for a different aspect of the VM. For example, a VM may be associated with multiple VM identifiers, each of which identifies a different virtual network interface implemented by the VM. In some examples, a VM identifier may be a media access control (MAC) address, a virtual station interface (VSI) identifier, or any other suitable type of information. In such examples, the MAC address or VSI identifier may identify a virtual network interface (e.g., a vNIC, etc.) implemented by a VM. In such examples, the MAC address or VSI identifier may be referred to herein as being associated with the VM that implements the virtual network interface identified by the MAC address or VSI identifier. In examples in which VSI identifiers are used as VM identifiers, network management server 100, network interconnection devices managed by server 100, and the host manager may each operate in accordance with at least one of an IEEE 802.1Qbg edge virtual bridging (EVB) standard and a virtual Ethernet port aggregator (VEPA) standard. Also in some examples, service types 116 may be associated with virtual network interfaces implemented by VMs by associating VM identifiers for the virtual network interfaces with the service types 116.

In the example of FIG. 1, network management server 100 may receive a VM identifier 186 from an edge switch of the computer network. The edge switch may connect at least one VM host server managed by the host manager to a core of the computer network managed by network management server 100. In such examples, the edge switch may be connected to the network core indirectly through at least one other network interconnection device or directly. As used herein, an "edge switch" of a computer network is a network interconnection device forming, for at least one server, a point of entry to the rest of the network interconnection devices of the computer network. In some examples, the VM identifier 186 may be received when a virtual machine associated with VM identifier 186 is started at a VM host server managed by the host manager and connected to the edge switch. In such examples, when the virtual machine is started on the VM host server, the host manager may cause a hypervisor of the VM host server hosting the virtual machine to send a communication including VM identifier 186 to the edge switch. The edge switch may in response to the communication, send the VM identifier 186 to network management server 100. In examples in which VM identifier 186 is a VSI identifier, the host manager may provide the VSI identifier to the edge switch as part of a connection discovery protocol, such as virtual discovery protocol (VDP) of the IEEE 802.1Qbg standard. In some examples, VM identifier 186 may be a VSI identifier for a virtual network interface of the VM associated with VM identifier 186. In such examples, the started VM may implement multiple virtual network interfaces, and a VSI identifier (or other VM identifier) for each of the virtual network interfaces may be provided to server 100 via the edge switch, as described above. In such examples, server 100 may perform the functionalities described below in relation to VM identifier 186 for each received VM identifier.

In some examples, in response to receiving VM identifier 186 from the edge switch, instructions 130 may access the VM identifier associations 118 to determine a service type 116 associated with the received VM identifier 186. For example, if VM identifier 186 is equivalent to the VM identifier 183, then instructions 130 may determine that the selected service type 117 is associated with the received VM identifier 186. As noted above, each of service types 116 may be associated with a plurality of network policies. In some examples, each of service types 116 may include information indicating where in the computer network (e.g., at which network interconnection devices of the computer network) each of the associated network policies is to be enforced when the service type 116 is implemented.

In the example of FIG. 1, a service type 116 associated with the received VM identifier 186 may include among its associated network policies at least one edge switch policy to be enforced at an edge switch when the virtual machine associated with the VM identifier 186 is started. In such examples, in response to receiving VM identifier 186 from the edge switch, instructions 130 may configure the edge switch with each of the edge switch policies of the service type 116 associated with the received VM identifier 186. In some examples, configuring the edge switch with the edge switch policies may include providing at least one configuration communication 188 to the edge switch. In some examples, instructions 130 may provide a configuration command 188 to edge switch for each of the edge switch network policies to cause the edge switch to enforce each of the edge switch network policies of the service type associated with the received VM identifier 186. As used herein, an "edge switch network policy" is a network policy to be enforced or otherwise applied at an edge switch of a computer network.

In some examples, instructions 130 may configure multiple ports of the edge switch in response to receiving the VM identifier 186. For example, the edge switch may include a downlink port to connect the edge switch to the VM host server from which the VM identifier 186 was received, and at least one other port. In some examples, the downlink port may connect the edge switch to the VM host server hosting a VM associated with the received VM identifier 186. As used herein, a "downlink port" of an edge switch is a port to connect the edge switch to a VM host server. Other ports may include, for example, ports to connect the edge switch to other network devices (e.g., network interconnection devices, servers, etc.) of the computer network. In some examples, the other ports may include an uplink port. As used herein, an "uplink port" is a port to connect the edge switch to a core of the computer network, either directly or indirectly through at least one other network interconnection device.

In some examples, instructions 130 may, in response to receiving the VM identifier from the edge switch, configure a downlink port of the edge switch and another port of the edge switch, each with at least one network policy of the service type 116 associated with the received VM identifier 186. In such examples, instructions 130 may configure the downlink port with at least one of the edge switch policies of the service type 116 associated with the received VM identifier 186. In some examples, instructions 130 may configure the downlink port and the other port (e.g., the uplink port, etc.) with the same network policies of the service type, different network policies of the service type, or a combination thereof.

In other examples, instructions 130 may also, in response to receiving VM identifier 186 from the edge switch, configure switch-wide attributes of the edge switch based on at least one network policy of the service type 116 associated with the received VM identifier 186. As used herein, a "switch-wide attribute" of a network interconnection device is a network policy to be applied by the network interconnection device as part of the configuration of each port of the network interconnection device. In some examples, a switch-wide attribute of a network interconnection device may specify a network policy to be inherited by each part of the network interconnection device that is configured (e.g., by the network management server) after the definition of the switch-wide attribute. For example, if a switch-wide attribute of a network interconnection device is a switch-wide QoS policy, then each port of the network interconnection device that is configured after the definition of the switch-wide attribute is configured to enforce the switch-wide QoS policy.

The service type 116 associated with the received identifier 186 may also include a plurality of network policies to be enforced at other network interconnection devices of the computer network. In some examples, in response to receiving the VM identifier 186 from the edge switch, instructions 130 may also configure at least one network interconnection device of the computer network, other than the edge switch, with at least one network policy of the service type 116 associated with the received VM identifier 186. In such examples, instructions 130 may configure, for example, at least one network interconnection device directly or indirectly connecting the edge switch to a core of the computer network. In some examples, at least one of the edge switch network policies may be the same as at least one of the policies instructions 130 configure another network interconnection device to enforce.

Additionally, in some examples, in response to receiving VM identifier 186 from the edge switch, instructions 128 may determine whether the at least one edge switch network policy of the service type 116 associated with the received VM identifier 186 is consistent with a network policy currently enforced by another switch of the computer network. For example, if the edge switch network policies include a QoS policy to be enforced at the edge switch, then instructions 128 may determine whether QoS policies enforced by at least one other network interconnection device of the computer network is consistent with the QoS policy to be enforced at the edge switch. In some examples, instructions may determine whether a DoS policy enforced by at least one network interconnection device directly or indirectly connecting the edge switch to the network core to is consistent with the QoS policy to be applied at the edge switch. In other examples, if the edge switch policies include a policy to configure the edge switch to connect a VLAN to the edge switch, then instructions 128 may determine whether policies currently enforced by at least one network interconnection device connecting the edge switch to the network core (e.g., at least one distributional core switch) are each configured with policies to connect the VLAN to the network core.

In some examples, if instructions 128 determine that a network policy enforced by another network switch is not consistent with an edge switch network policy of the subscription type 116, then instructions 130 may alter the network policy currently enforced by the other switch. For example, instructions 130 may replace the network policy with another policy that is consistent with the edge switch network policy.

Additionally, in some examples, in response to receiving the VM identifier 186 from the edge switch, instructions 128 may determine whether the edge switch has a sufficient amount of at least one computing resource available to implement each edge switch network policy of the service type 116 associated with the received VM identifier 186. In examples described herein, computing resources may include, for example, memory, storage space, computational capabilities (e.g., CPU capabilities), bandwidth, etc. For example, if one of the edge switch network policies reserves a given amount of bandwidth at the edge switch, instructions 128 may determine whether the other network policies currently enforced at the edge switch leave at least the given amount of bandwidth available for the edge switch network policy. In some examples, if instructions 128 determine that the edge switch does not have a sufficient amount of at least one computing resource, then instructions 128 may output an alert indicating this determination. In some examples, instructions 130 may still configure with the edge switch with the edge switch network policy regardless of the alert. In other examples, instructions 128 may prevent instructions 130 from configuring the edge switch with the edge switch network policy. In some examples, functionalities described herein in relation to FIG. 1 may be provided in combination with functionalities described herein in relation to any of FIGS. 2-4.

Figure 2:
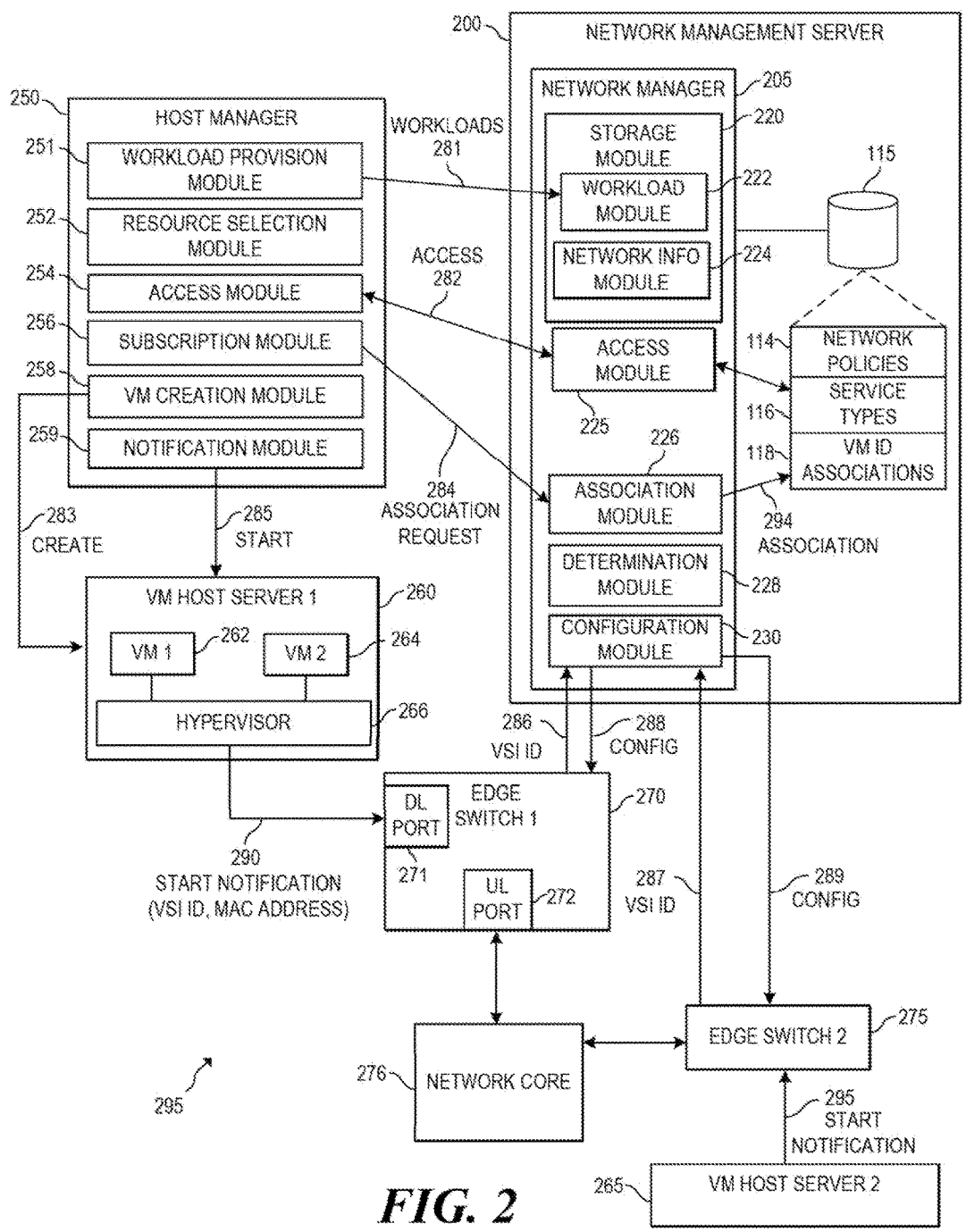
FIG. 2 is a block diagram of an example system including a host server to access published service types published at a network management server.

FIG. 2 is a block diagram of an example system 295 including a host server 260 to access published network configuration service types 116 published at a network management server 200. In the example of FIG. 2, system 295 includes network management server 200, a host manager 250, first and second VM host servers 260 and 265, first and second edge switches 270 and 275, and a network core 276. Network management server 200 may include policy storage 115 that may store network policies 114, network configuration service types 116, and a collection of VM identifier associations 118, as described above in relation to FIG. 1. In the example of FIG. 2, edge switch 270 includes at least one downlink port 271 and at least one uplink port 272. In some examples, edge switch 275 may also include at least one downlink port and at least one uplink port. Server 200 may also include a network manager 205 including a storage module 220, an access module 225, and association module 226, a determination module 228, and a configuration module 230. In some examples, the functionalities of network manager 205 may each be implemented in the form of executable instructions encoded on a machine-readable storage medium, in the form of electronic circuitry, or a combination thereof. In some examples, network management server 200 may manage at least one network interconnection device of a computer network. In the example of FIG. 2, server 200 may manage at least edge switches 270 and 275.

Additionally, any VM host server described herein may be for example, a computing device such as a web server, a database server, a Local Area Network (LAN) server, or any other server or computing device suitable for hosting at least one virtual machine and communicating with other servers via network interconnection devices of a computer network. In the example of FIG. 2, VM host server 260 may comprise a hypervisor 266 and host virtual machines 262 and 264. In other examples, VM host server 260 may host fewer or additional virtual machines. In some examples, VM host server 265 may also include a hypervisor and host at least one virtual machine.

In the example of FIG. 2, host manager 250 may include a workload provision module 251, a resource selection module 252, an access module 254, a subscription module 256, a VM creation module 258, and a notification module 259. In some examples, the functionalities of host manager 250 may each be implemented in the form of executable instructions encoded on a machine-readable storage medium, in the form of electronic circuitry, or a combination thereof. In some examples, host manager 250 may be implemented on one of VM host server of system 295, or may be a distributed system implemented in part on each of two or more VM host servers. In other examples, host manager 250 may be implemented on a server separate from each of VM host servers of system 295. In the example of FIG. 2, host manager 250 manages at least VM host server 260. In other examples, host manager 250 may also manage additional VM host servers.

In the example of FIG. 2, workload provision module 251 of host manager 250 may provide a plurality of workload descriptions 281 to server 200. In some examples, the workload descriptions may include, for example, descriptions of anticipated network usage, network behaviors, or other network workloads for a plurality of virtual machines hosted by or anticipated to be created at any one of the VM host servers managed by host manager 250. In the example of FIG. 2, storage module 220 of network manger 205 may include a workload module and a network information module 224. In such examples, workload module 222 may receive, from host manager 281, respective workload descriptions 281 for each of the virtual machines hosted by or anticipated to be created at one of the VM host servers managed by host manager 250.

In some examples, network information module 224 may retrieve network information associated with the computer network managed by server 200. The network information may include, for example, at least one of information regarding the state of network interconnection devices of the computer network (e.g., available computing resources at the device), computer network topology information, existing policies deployed at network interconnection device of the computer network, and the like, or a combination thereof. Storage module 220 may store network policies 114 and service types 116 in policy storage 115. In some examples, each of the storage types 116 may be associated with a plurality of the network policies 114. In some examples, each of service types 116 is based on the workload descriptions 281 received by module 222 and the network information retrieved by module 224. For example, storage module 220 may output the workload descriptions 281 and the network information to a user (e.g., a network administrator) who may create the network policies 114 and service types 116 based on descriptions 281 and the network information, and input the policies 114 and service types 116 to storage module 220. In such examples, storage module 220 may store the received policies 114 and service types 116 in policy storage 115.

In the example of FIG. 2, host manager 250 may implement a virtual machine creation process. In some examples, the creation of a VM may include selecting computing resources for the VM being created. In the example of FIG. 2, resource selection module 252 host manager 250 may receive a selection of at least one computing resource to be provided for a VM being created at host manager 250. In some examples, the selection of computing resources may be received from a user of host manager 250, such as a system administrator. For example, the selection of computing resources may include a selection of at least one of an amount of memory, an amount of storage space, an amount of computational capabilities (e.g., CPU capabilities), and the like, or a combination thereof.

In some examples, access module 225 may provide, to at least one device outside of server 200, access to the service types 116 stored in policy storage 115. In such examples, storage module 220 may publish storage types 116 by storing them in policy storage 115. In some examples, module 225 may provide an interface for accessing service types 116 stored in policy storage 115 from outside of server 200, as described above in relation to instructions 124 of FIG. 1.

In some examples, at least portions of policy storage 115 may be accessible to access module 254 of host manager 250. For example, module 225 may provide an interface for accessing service types 116 with access module 254 of host manager 250. In the example of FIG. 2, access module 254 may access the service types 116 published on server 200. For example, access module 254 may request and receive access to service types 116 via access communications 282 between access module 254 of host manager 250 and access module 225 of server 200. In such examples, access module 225 may access service types 116 and provide the accessed service types 116 to host manager via access communications 282.

In the example of FIG. 2, subscription module 256 of host manager 250 may request that server 200 associate a selected one of service types 116 with a given VM identifier. In some examples, the module 256 may provide an association request 284 to server 200 to request the association. In such examples, the association request 284 may include an indication of the selected service type 116 and include the VM identifier to be associated with the selected service type, as described above in relation to request 184 of FIG. 1. In some examples, access module 254 may output the published service types 116 received from server 200, and module 256 may receive a selection of one of the service types 116 (e.g., from a user) to associate with the VM being created at host manager 250. In such examples, in response to receiving the selection, module 256 may provide the association request 284 including an indication of the selected service type 116 and a VM identifier associated with the VM being created. In such examples, the VM identifier may be created for the VM (or an aspect thereof, such as a virtual network interface of the VM) by VM creation module 258 prior to providing request 284.

In some examples, the request 284 may be received from host manager 250 by network manager 205. In response to the association request 284, association module 226 of network manager 205 may associate, in policy storage 115, the VM identifier included in request 284 with the selected service type 116 indicated in request 284. In such examples, module 226 may provide an association command 294 to policy storage 115 to store the association between the selected service type 116 and the VM identifier in policy storage 115 as one of VM identifier associations 118.

In the example of FIG. 2, VM creation module 258 of host manager 250 may create a VM associated with each of the selected computing resources and the generated VM identifier. For example, module 258 may provide a VM creation command 283 to create a VM (e.g., VM 262) to be hosted by VM host server 260. Although modules 252, 254, and 256 have been described above in the context of creating a new VM, in other examples, each of these modules may also be used in other processes of host manager 250, such as modifying, moving, or otherwise interacting with characteristics of a VM, or as part of a separate service type association process.

In some examples, notification module 259 may deploy or otherwise start a virtual machine on VM host server 260 in such examples, when module 259 starts a VM, such as VM 262, on VM host server 260, module 259 may also provide a start communication 286 to VM host server 260 to cause VM host server 260 to provide a start notification 290 to edge switch 270 connecting VM host server 260 to network core 276. In some examples, the start communication 285 may be provided to hypervisor 266, which may provide notification 290 to edge switch 270 in response. Start notification 290 may include, for example, both a VM identifier and a MAC address associated with the VM (e.g., VM 262) started at VM host server 260. In some examples, providing start notification 290 to edge switch 270 may cause the edge switch 270 to provide the VM identifier included in notification 290 to server 200. In some examples, notification 290 may be a communication to indicate that the VM has been started. In such examples, edge switch 270 may recognize notification 290 and extract the VM identifier and provide it to server 200.

In the example of FIG. 2, the VM identifier may be a VSI identifier. In such examples, notification 290 may be provided in accordance with a connection discovery protocol such as VDP of the IEEE 802.1Qbg standard. In some examples, the VSI identifier may identify a virtual network interface of the VM associated with the VM identifier. In such examples, the VM may be associated with multiple VSI identifiers (or other VM identifiers). For example, the VM may be associated with one VSI identifier (or other VM identifier) for each virtual network interface implemented by the VM. In such examples, multiple VSI identifiers may be provided to server 200 via edge switch 270 in response to starting the VM. In such examples, the VSI identifiers may be provided in the same or separate notifications 290. In some examples, after extracting a VSI identifier from a received notification 290, edge switch 270 may provide the identifier to server 200 as VSI identifier 286. In other examples, a MAC address associated with the started VM may be the VM identifier. Using a VSI identifier as the VM identifier in accordance with examples described herein may be more secure than using a MAC address. For example, a VSI identifier may be used in limited circumstances in some examples described herein, such as during association of the VSI identifier with a selected service type and the notification of the start of an associated VM, allowing less opportunity for unauthorized interception of the VSI identifier and thus reducing the risk of spoofing using an intercepted VSI identifier. Additionally, a MAC address is generally provided in cleartext in network traffic to allow use by network interconnection devices for traffic routing, for example. However, in examples described herein, the VSI identifier may be encrypted or otherwise secured within notification 290, which may reduce the risk of interception and spoofing with the VSI identifier.

Additionally, in some examples, notification 290 may include both a MAC address for traffic routing at edge switch 270, and a VSI identifier to identify a virtual network interface implemented by the VM that was started to allow server 200 to determine the correct service type 116 for provisioning network interconnection devices.

As noted above, in response to receiving start notification 290 including a VSI identifier, edge switch 270 may provide the included VSI identifier 286 to server 200. In response to receiving VSI identifier 286 from edge switch 270, configuration module 230 of network manager 205 may configure edge switch 270 with at least one of the network policies 114 of a service type 116 associated with VSI identifier 286. For example, module 230 may provide at least one configuration communication 288 to edge switch 270 to configure edge switch 270 to enforce at least one policy of the associated service type 116. In some examples, module 230 may configure edge switch 270 with at least one network policy 114 of the service type 116 associated with the VSI identifier 286 by providing at least one configuration command to edge switch 270 to cause edge switch 270 to enforce the network policies 114 appropriate for the edge switch. In some examples, module 230 may configure each of a downlink port 271 and an uplink port 272 of edge switch 270 with at least one of the network policies associated with service type 116 associated with VSI identifier 286. In such examples, downlink port 271 may connect edge switch 270 to the VM host server 260 from which the start notification 290 including the VSI identifier was received. Additionally, in such examples, uplink port 272 may connect edge switch 270 to network core 276 either directly or indirectly through at least one other network interconnection device. In some examples, module 230 may configure the downlink port and the uplink port with the same network policies of the service type, different network policies of the service type, or a combination thereof.

Additionally, in some examples, in response to receiving the VSI identifier 286 from edge switch 270, determination module 228 of network module 205 may determine whether each one network policy 114 of the service type 116 associated with the VSI identifier 286 to be enforced at edge switch 270 is consistent with a network policy currently enforced by another network switch of the computer network, as described above in relation to instructions 128 of FIG. 1. The other network switch may be, for example, a network switch connecting edge switch 270 to network core 276 directly or indirectly. If module 228 determines that another network policy is not consistent, module 228 may alter the network policy, as described above in relation to instructions 130 of FIG. 1.

In some examples, in response to receiving the VM identifier 286 from edge switch 270, module 228 may also determine whether edge switch 270 has a sufficient amount of at least one computing resource available to implement edge switch network policy 114 of the service type 116 associated with the received VM identifier 286, as described above in relation to instructions 128 of FIG. 1. In some examples, if it is determined that the edge switch 270 does not have sufficient available resources, storage module 220 may modify network policies 114 stored in policy storage 115 to accommodate resource availability. In such examples, resource availability information determined by module 228 may be provided to module 224. In this manner, the resource availability information may be a portion of the network information on which service types 116 are based.

Additionally, in some examples, a VM, such as VM 262, may be migrated from VM host server 260 to another VM host server, such as VM host server 265. In such examples, when VM 262 is started on VM host server 265, a host manager for server 265 may also cause a hypervisor of server 265 to provide a start notification 295, including a VM identifier (e.g., at least one VSI identifier) associated with VM 262, to edge switch 275 indirectly or directly connecting VM host server 265 to network core 276 of the computer network managed by server 200. In response to receiving notification 295, edge switch 275 may provide the received VSI identifier 287 to server 200. In response to receiving VSI identifier 287 from edge switch 275, configuration module 230 may configure edge switch 275 with at least one of the network policies 114 of a service type 116 associated with the received VSI identifier in policy storage 115. To configure edge switch 275, module 230 may provide at least one configuration communications 289, which may be configuration commands to cause edge switch 270 to enforce the network policies 114. In some examples, in response to receiving VSI identifier 286, module 230 may configure each of a downlink port and an uplink port of edge switch 275, as described above in relation to edge switch 270. In some examples, functionalities described herein in relation to FIG. 2 may be provided in combination with functionalities described herein in relation to any of FIGS. 1 and 3-4.

Figure 3:
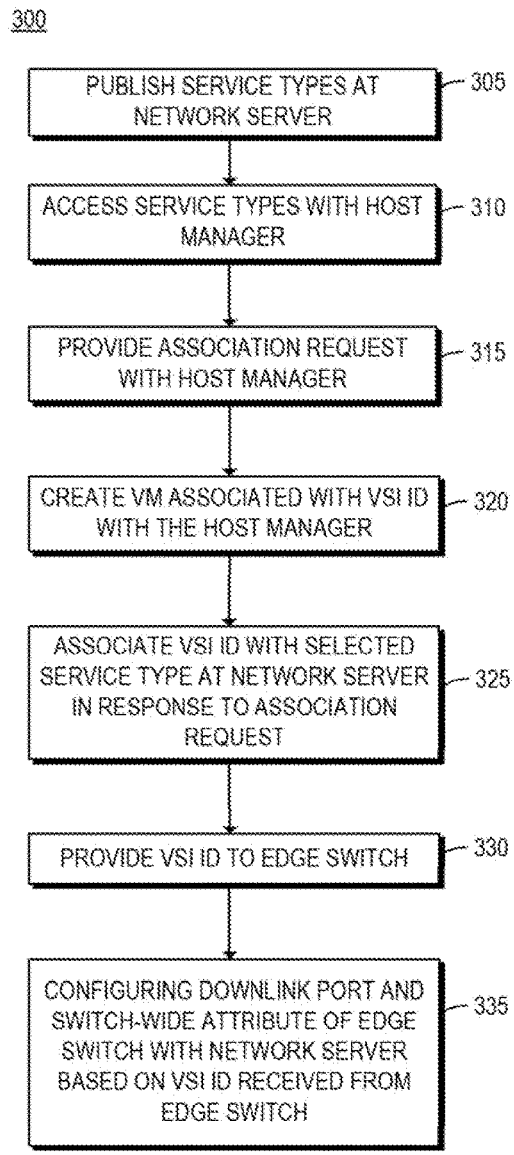
FIG. 3 is a flowchart of an example method for accessing published service types at a network management server.

FIG. 3 is a flowchart of an example method 300 for accessing published service types at a network management server. Although execution of method 300 is described below with reference to system 295 of FIG. 2, other suitable components for execution of method 300 can be utilized. Additionally, method 300 may be implemented in the form of executable instructions encoded on a machine-readable storage medium, in the form of electronic circuitry, or a combination thereof.

At 305 of method 300, network management server 200 may publish a plurality of network configuration service types 116, each associated with a plurality of network connection policies 114, in policy storage 115 of network management server 200. At 310, access module 254 of host manager 250 may access the service types 116 published at network management server 200. In such examples, module 254 may access the service types 116 stored in policy storage 115 via an access module 226 of network manager 205 of network management server 200.

At 315, a subscription module 256 of host manager 250 may provide an association request 284 to network management server 200. In such examples, the request 284 may indicate a selected one of the service types 116 and include a VSI identifier. At 320, a VM creation module 258 of host module 250 may create a VM associated with the VSI identifier at a selected VM host server 260 of a plurality of VM host servers managed by host manager 250. At 325, in response to receiving the association request 284 at network management server 200, an association module 226 of network manager 205 may associate, in policy storage 115, the VSI identifier included in the request 284 with the selected service type 116 indicated in the request 284.

At 330, if the created VM is started on VM host server 260, a notification module 259 of host manager 250 may provide the VSI identifier associated with the VM to edge switch 270 directly or indirectly connecting VM host server 260 to a network core 276 of the computer network managed by server 200. In some examples, notification module 259 may provide the VSI identifier to edge switch 270 via VM host server 260, as described above in relation to FIG. 2. For example, module 259 may cause hypervisor 266 to provide a start notification 290 including the VSI identifier to edge switch 270. In response to receiving the VSI identifier, edge switch 270 may provide the VSI identifier to server 200. In some examples, the started VM may be associated with multiple VSI identifiers (or other VM identifiers). For example, the VM may be associated with one VSI identifier for each virtual network interface implemented by the VM. In such examples, multiple VSI identifiers may be provided to server 200 as described above when server 200 is started.

At 335, in response to receiving the VSI identifier from edge switch 270 at network management server 200, a configuration module 230 of a network manager 205 of server 200 may configure edge switch 270 to enforce at least one network policy 114 of the service type 116 associated with the received VSI identifier in policy storage 115. In some examples, module 230 may perform the functionalities described above for each received VM identifier (e.g., VSI identifier). In some examples, at 335, in response to receiving the VSI identifier from edge switch 270 at server 200, module 230 may configure a downlink port 271 of edge switch 270 (e.g., connecting edge switch 270 to VM host server 260) and a switch-wide attribute of edge switch 270 based on at least one network policy of the service type 116 associated with the received VSI identifier. In some examples, the downlink port 271 and the switch-wide attribute may be configured based on the same network policies of the service type, different network policies of the service type, or a combination thereof.

Figure 4:
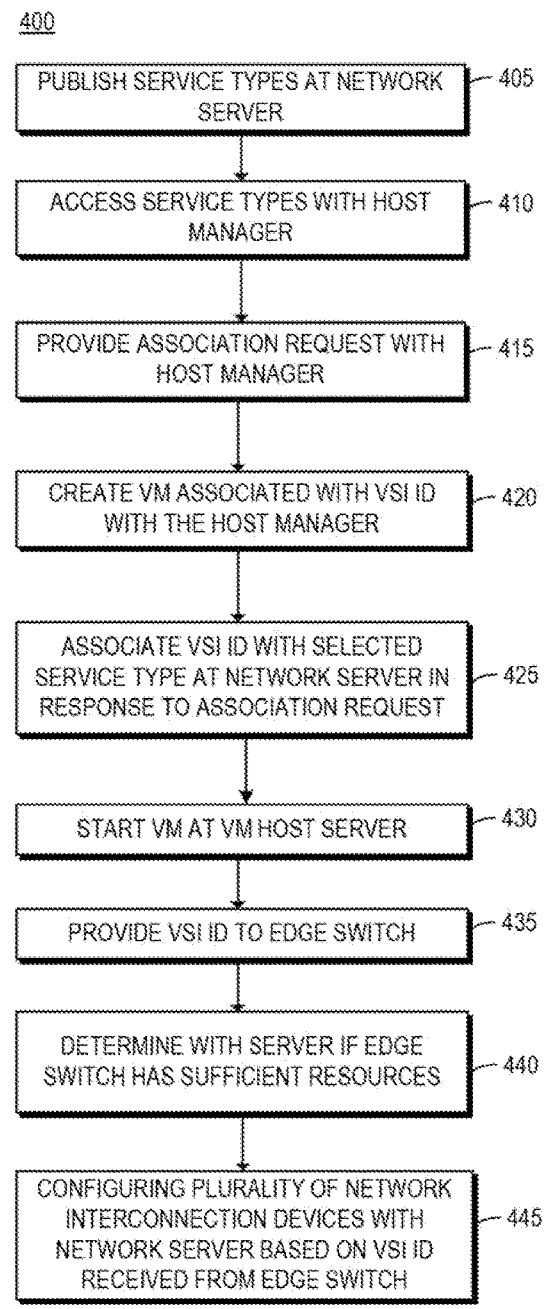
FIG. 4 is a flowchart of an example method for configuring a plurality of network interconnection devices based on a received identifier.

FIG. 4 is a flowchart of an example method 400 for configuring a plurality of network interconnection devices based on a received identifier. Although execution of method 400 is described below with reference to system 295 of FIG. 2, other suitable components for execution of method 400 can be utilized. Additionally, method 400 may be implemented in the form of executable instructions encoded on a machine-readable storage medium, in the form of electronic circuitry, or a combination thereof.

At 405 of method 400, network management server 200 may publish a plurality of network configuration service types 116, each associated with a plurality of network connection policies 114, in policy storage 115 of network management server 200. At 410, access module 254 of host manager 250 may access the service types 116 published at network management server 200 via an access module 226 of network management server 200.

At 315, a subscription module 256 of host manager 250 may provide to network management server 200 an association request 284 indicating a selected one of the service types 116 and including a VSI identifier. At 320, a VM creation module 258 of host module 250 may create a VM associated with the VSI identifier at a selected VM host server 260 of a plurality of VM host servers managed by host manager 250. At 325, in response to receiving the association request 284 at network management server 200, an association module 226 of network manager 205 may associate, in policy storage 115, the VSI identifier included in the request 284 with the selected service type 116 indicated in the request 284.

At 430, notification module 259 of host manager 250 may start the created VM on VM host server 260. At 435, when the created VM is started on VM host server 260, a notification module 259 of host manager 250 may provide the VSI identifier associated with the VM to edge switch 270 directly or indirectly connecting VM host server 260 to a network core 276 of the computer network managed by server 200. In some examples, when the VM is started on VM host server 260, module 259 may cause VM host server 260 to provide a start notification 290, including the VSI identifier and a MAC address for the started VM, to edge switch 270. In response to receiving the VSI identifier, edge switch 270 may provide the VSI identifier to server 200. In some examples, the started VM may be associated with multiple VSI identifiers (or other VM identifiers). For example, the VM may be associated with one VSI identifier for each virtual network interface implemented by the VM. In such examples, multiple VSI identifiers may be provided to server 200 as described above when server 200 is started.

At 440 in response to receiving the VM identifier from edge switch 270 at server 200, a determination module 228 of server 220 may determine whether the at least network policy 114 of the service type 116 associated with the received VM identifier is consistent with a network policy currently enforced by another network switch of the computer network managed by server 200. In some examples, if the network policy of the other network switch is not consistent, that policy may be altered, as described above in relation to FIGS. 1 and 2. At 445, in response to receiving the VSI identifier from edge switch 270 at network management server 200, a configuration module 230 of a network manager 205 of server 200 may configure a plurality of network interconnection devices of the computer network, including edge switch 270, to enforce at least one network policy 114 of the service type 116 associated with the received VSI identifier in policy storage 115. In some examples, modules 228 and 230 may perform the functionalities described above for each received VM identifier (e.g., VSI identifier). In some examples, at 445, in response to receiving the VSI identifier from edge switch 270 at server 200, module 230 may configure a downlink port 271 of edge switch 270 (e.g., connecting edge switch 270 to VM host server 260) and a switch-wide attribute of edge switch 270 based on at least one network policy of the service type 116 associated with the received VSI identifier. In some examples, the downlink port 271 and the switch-wide attribute may be configured based on the same network policies of the service type, different network policies of the service type, or a combination thereof.

What is claimed is:

1. A system comprising:
a network management server to manage at least one network interconnection device of a computer network; and
a host manager to manage a first virtual machine (VM) host server connected to a core of the computer network via a first edge switch, the host manager comprising:
electronic circuitry; and
a non-transitory machine-readable storage medium comprising instructions executable by the electronic circuitry of the host manager to:
receive a selection of at least one computing resource;
access a plurality of network configuration service types published on the network management server;
request, with an association request, that the network management server associate a selected one of the service types with a VM identifier; and
create a VM associated with each selected computing resource and the VM identifier;
wherein the network management server comprises:
policy storage, accessible to the access module of the host manager, to store the plurality of service types, each associated with a plurality of network policies;
electronic circuitry; and
a non-transitory machine-readable storage medium comprising instructions executable by the electronic circuitry of the network management server to:
associate, in the policy storage, the VM identifier with the selected service type in response to the association request received from the host manager; and
configure each of a downlink port and an uplink port of the first edge switch with at least one of the network policies associated with the selected service type in response to receiving the VM identifier from the first edge switch, wherein the downlink port is to connect the first edge switch to the first VM host server, and the uplink port is to connect the first edge switch to the core.

2. The system of claim 1, wherein the VM identifier is a virtual station interface (VSI) identifier associated with a virtual network interface of the VM.

3. The system of claim 2, wherein the instructions executable by the electronic circuitry of the host manager further comprise instructions to:
cause the first VM host server to provide a start notification, including the VSI identifier and a media access control (MAC) address associated with the VM, to the first edge switch to cause the first edge switch to provide the VSI identifier to the network management server, if the VM is started on the first VM host server.

4. The system of claim 3, wherein:
the instructions to configure further comprise instructions to configure a second edge switch, connecting a second VM host server to a core of the computer network, with at least one of the network policies associated with the selected service type in response to receiving the VSI identifier from the second edge switch.

5. The system of claim 1, wherein to configure the first edge switch with the at least one of the network policies, the instructions to configure further comprise instructions to provide to the first edge switch at least one configuration command to cause the first edge switch to enforce the at least one of the network policies.

6. The system of claim 1, wherein the instructions executable by the electronic circuitry of the network management server further comprise instructions to:
receive, from the host manager, a respective workload description for each of a plurality of VMs, each hosted by one of the at least one VM host server managed by the host manager; and
retrieve network information associated with the computer network, wherein each of the service types is based on the workload descriptions and the network information.

7. A non-transitory machine-readable storage medium encoded with instructions executable by a processor of a network management server to manage at least one network interconnection device of a computer network, the storage medium comprising:
- instructions to publish, in policy storage of the network management server, a plurality of network configuration service types, each associated with a plurality of network policies;
- instructions to provide access to the published service types to a host manager, the host manager to manage a virtual machine (VM) host server to host a VM associated with a VM identifier;
- instructions to associate, in the policy storage, a selected one of the service types with the VM identifier in response to an association request, received from the host manager, indicating the selected service type and including the VM identifier;
- instructions to determine, in response to receiving the VM identifier from an edge switch connecting the at least one VM host server to a core of the computer network, whether at least one edge switch network policy of the selected service type associated with the received VM identifier is consistent with a network policy currently enforced by another network switch of the computer network; and
- instructions to configure, in response to receiving the VM identifier from the edge switch, a downlink port of the edge switch with the at least one edge switch network policy and configure another port of the edge switch with at least one network policy associated with the selected service type, wherein the downlink port is to connect the edge switch to the VM host server and the another port is to connect the edge switch to a network device other than the VM host server.

8. The storage medium of claim 7, further comprising:
- instructions to alter the network policy currently enforced by the another switch if it is determined that the network policy currently enforced by the another switch is not consistent with the at least one edge switch network policy.

9. The storage medium of claim 8, wherein the instructions to configure further comprise:
- instructions to determine, in response to receiving the VM identifier from the edge switch, whether the edge switch has a sufficient amount of at least one computing resource available to implement the at least one edge switch network policy of the selected service type associated with the VM identifier.

10. The storage medium claim 7, wherein the instructions to configure further comprise:
- instructions to configure at least one network interconnection device of the computer network, other than the edge switch, with at least one network policy of the selected service type, in response to receiving the VM identifier from the edge switch.

11. The storage medium of claim 7, wherein:
- the VM identifier is a virtual station interface (VSI) identifier for a virtual network interface of the VM; and the another port is an uplink port to connect the edge switch to the core.

12. A method comprising:
- publishing a plurality of network configuration service types, each associated with a plurality of network connection policies, in policy storage of a network management server;
- accessing, with a host manager to manage at least one virtual machine (VM) host server, the service types published at the network management server;
- providing, with the host manager, an association request to the network management server indicating a selected one of the service types and a virtual station interface (VSI) identifier;
- creating, with the host manager, a VM associated with the VSI identifier at a selected one of the VM host servers;
- associating, in the policy storage, the VSI identifier with the selected service type in response to receiving the association request at the network management server;
- providing, with the host manager, the VSI identifier to an edge switch connecting the selected VM host server to a core of the computer network, if the VM is started on the selected VM host server, wherein a downlink port of the edge switch is to connect the edge switch to the selected VM host server; and
- configuring, with electronic circuitry of the network management server, the downlink port and at least one switch-wide attribute of the edge switch based on at least one network policy of the selected service type associated with the VSI identifier in response to receiving, at the network management server, the VSI identifier from the edge switch.

13. The method of claim 12, wherein the configuring the edge switch comprises:
- configuring, with the network management server, each of a plurality of network interconnection devices of the computer network, including the edge switch, to enforce at least one network policy of the selected service type associated with the VSI identifier, in response to receiving the VSI identifier from the edge switch at the network management server.

14. The method of claim 12, further comprising:
- determining, with the network management server, in response to receiving the VSI identifier from the edge switch, whether the at least one network policy of the selected service type associated with the received VSI identifier is consistent with a network policy currently enforced by another network switch of the computer network.

15. The method of claim 12, further comprising:
- starting the VM on the selected VM host server with the host manager, wherein the providing the VSI identifier comprises providing a start notification, including the VSI identifier and a media access control (MAC) address for the VM, to the edge switch if the VM is started on the selected VM host server.

* * * * *